US012679401B2

(12) United States Patent
Liang

(10) Patent No.: US 12,679,401 B2
(45) Date of Patent: Jul. 14, 2026

(54) DRIVER INTERVENTION GUIDING SYSTEM AND DRIVER INTERVENTION GUIDING METHOD AND NON-TRANSITORY COMPUTER-READABLE MEMORY

(71) Applicant: Optimal Intelligent Mobility Co., Ltd., Taichung City (TW)

(72) Inventor: Chih Neng Liang, Changhua County (TW)

(73) Assignee: Optimal Intelligent Mobility Co., Ltd., Taichung City (TW)

( * ) Notice: Subject to any disclaimer, the term of this patent is extended or adjusted under 35 U.S.C. 154(b) by 168 days.

(21) Appl. No.: 18/398,511

(22) Filed: Dec. 28, 2023

(65) Prior Publication Data

US 2025/0178633 A1 Jun. 5, 2025

(30) Foreign Application Priority Data

Dec. 5, 2023 (TW) ................................ 112147141

(51) Int. Cl.
*B60W 50/16* (2020.01)
*B60W 40/08* (2012.01)
(Continued)

(52) U.S. Cl.
CPC ............ *B60W 50/16* (2013.01); *B60W 40/08* (2013.01); *B60W 60/0053* (2020.02);
(Continued)

(58) Field of Classification Search
CPC .. B60W 50/16; B60W 40/08; B60W 60/0053; B60W 2050/146; B60W 2540/10; B60W 2540/12; B60W 50/14
See application file for complete search history.

(56) References Cited

U.S. PATENT DOCUMENTS

2019/0204826 A1* 7/2019 Tsai ........................ B60K 31/00
2022/0194434 A1* 6/2022 Ha ........................ B60W 50/14
(Continued)

FOREIGN PATENT DOCUMENTS

CN 113825689 A 12/2021
CN 116985846 A 11/2023
(Continued)

*Primary Examiner* — James J Lee
*Assistant Examiner* — Alexander George Matta
(74) *Attorney, Agent, or Firm* — CKC & Partners Co., LLC

(57) ABSTRACT

A driver intervention guiding system includes a processor. The processor includes a driver condition identifying module, a vehicle dynamic identifying module, an environment identifying module, a system diagnosis module, a driver intervention parameter calculating module, a script database, and a script executing module. The driver condition identifying module provides a driver value based on a condition of a driver. The vehicle dynamic identifying module provides a vehicle dynamic value based on a dynamic of a vehicle. The environment identifying module provides an environment value based on a driving environment of the vehicle. The system diagnosis module provides a diagnostic value. The driver intervention parameter calculating module calculates a driver intervention parameter based on the driver value, the vehicle dynamic value, the environment value and the diagnostic value. The script executing module selects one of scripts of the script database based on the driver intervention parameter.

7 Claims, 3 Drawing Sheets

(51) Int. Cl.
    B60W 50/14        (2020.01)
    B60W 60/00        (2020.01)

(52) U.S. Cl.
    CPC ... *B60W 2050/146* (2013.01); *B60W 2540/10* (2013.01); *B60W 2540/12* (2013.01)

(56) References Cited

U.S. PATENT DOCUMENTS

2024/0286652 A1*   8/2024   Kuehner ........... B60W 60/0057
2024/0326774 A1*  10/2024   Suzuki ................. B60W 10/20

FOREIGN PATENT DOCUMENTS

| | | |
|---|---|---|
| CN | 117087697 A | 11/2023 |
| TW | 201924992 A | 7/2019 |
| TW | 202332608 A | 8/2023 |

* cited by examiner

DRIVER INTERVENTION GUIDING SYSTEM AND DRIVER INTERVENTION GUIDING METHOD AND NON-TRANSITORY COMPUTER-READABLE MEMORY

RELATED APPLICATIONS

This application claims priority to Taiwan Application Serial Number 112147141, filed Dec. 5, 2023, which is herein incorporated by reference.

BACKGROUND

Technical Field

The present disclosure relates to a guiding system and a guiding method. More particularly, the present disclosure relates to a driver intervention guiding system and a driver intervention guiding method.

Description of Related Art

Recently, advanced driver assistance systems (ADAS) were developed, which include sensors, such as a radar and a camera, to detect a driving environment, e.g., obstacles. ADAS may assist for remaining the speed and providing relevant warnings to increase the driving safety, and may even control the vehicle to prevent accident.

According to the improvement of the technique, the vehicles are developed from assistance driving to self-driving. Society of automobile engineers (SAE) defines Level 0 to Level 5 from assistance driving to full self-driving. A self-driving vehicle in Level 3 may drive by the system in a specific condition such as lane keeping, and may remind the driver to take over when there is a necessary to have the driver intervene.

However, in the current technique, no appropriate guidance is provided as the system reminds the driver to operate the vehicle or intervene to take over, and dangers may occur owing to that the driver may not get into conditions. Based above, how to appropriately guide the driver to intervene the operation or the control of the vehicle becomes a target that those in the field pursue.

SUMMARY

According to one aspect of the disclosure, a driver intervention guiding system includes a driver condition detecting device installed at a vehicle and configured for detecting a condition of a driver of the vehicle, a vehicle dynamic detecting device installed at the vehicle and configured for detecting a dynamic of the vehicle, an environment detecting device installed at the vehicle and configured for detecting a driving environment of the vehicle, and a processor installed at the vehicle. The processor includes a driver condition identifying module, a vehicle dynamic identifying module, an environment identifying module, a system diagnosis module, a driver intervention parameter calculating module, a script database, and a script executing module. The driver condition identifying module is signally connected to the driver condition detecting device, and provides a driver value based on the condition of the driver. The vehicle dynamic identifying module is signally connected to the vehicle dynamic detecting device, and provides a vehicle dynamic value based on the dynamic of the vehicle. The environment identifying module is signally connected to the environment detecting device, and provides an environment value based on the driving environment of the vehicle. The system diagnosis module is configured to diagnose a condition of a system of the vehicle and to provide a diagnostic value according thereto. The driver intervention parameter calculating module is signally connected to the driver condition identifying module, the vehicle dynamic identifying module, the environment identifying module and the system diagnosis module, and calculates a driver intervention parameter based on the driver value, the vehicle dynamic value, the environment value and the diagnostic value. The script database includes a plurality of scripts. The script executing module is signally connected to the driver intervention parameter calculating module and the script database, and the script executing module selects one of the scripts of the script database based on the driver intervention parameter.

According to another aspect of the disclosure, a driver intervention guiding method includes a driver value calculating step, a vehicle dynamic value calculating step, an environment value calculating step, a diagnostic value calculating step, a driver intervention parameter calculating step, and a script executing step. In the driver value calculating step, a driver condition detecting device of a processor provides a driver value based on a condition of a driver of a vehicle. In the vehicle dynamic value calculating step, a vehicle dynamic identifying module of the processor provides a vehicle dynamic value based on a dynamic of the vehicle. In the environment value calculating step, an environment identifying module of the processor provides an environment value based on a driving environment of the vehicle. In the diagnostic value calculating step, a system diagnosis module of the processor diagnoses a condition of a system of the vehicle and provides a diagnostic value according thereto. In the driver intervention parameter calculating step, a driver intervention parameter calculating module of the processor calculates a driver intervention parameter based on the driver value, the vehicle dynamic value, the environment value and the diagnostic value. In the script executing step, a script executing module of the processor selects one of a plurality of scripts of a script database based on the driver intervention parameter.

BRIEF DESCRIPTION OF THE DRAWINGS

The present disclosure can be more fully understood by reading the following detailed description of the embodiment, with reference made to the accompanying drawings as follows:

FIG. 1 shows a block diagram of a driver intervention guiding system according to one embodiment of the present disclosure.

DETAILED DESCRIPTION

Figure 2:
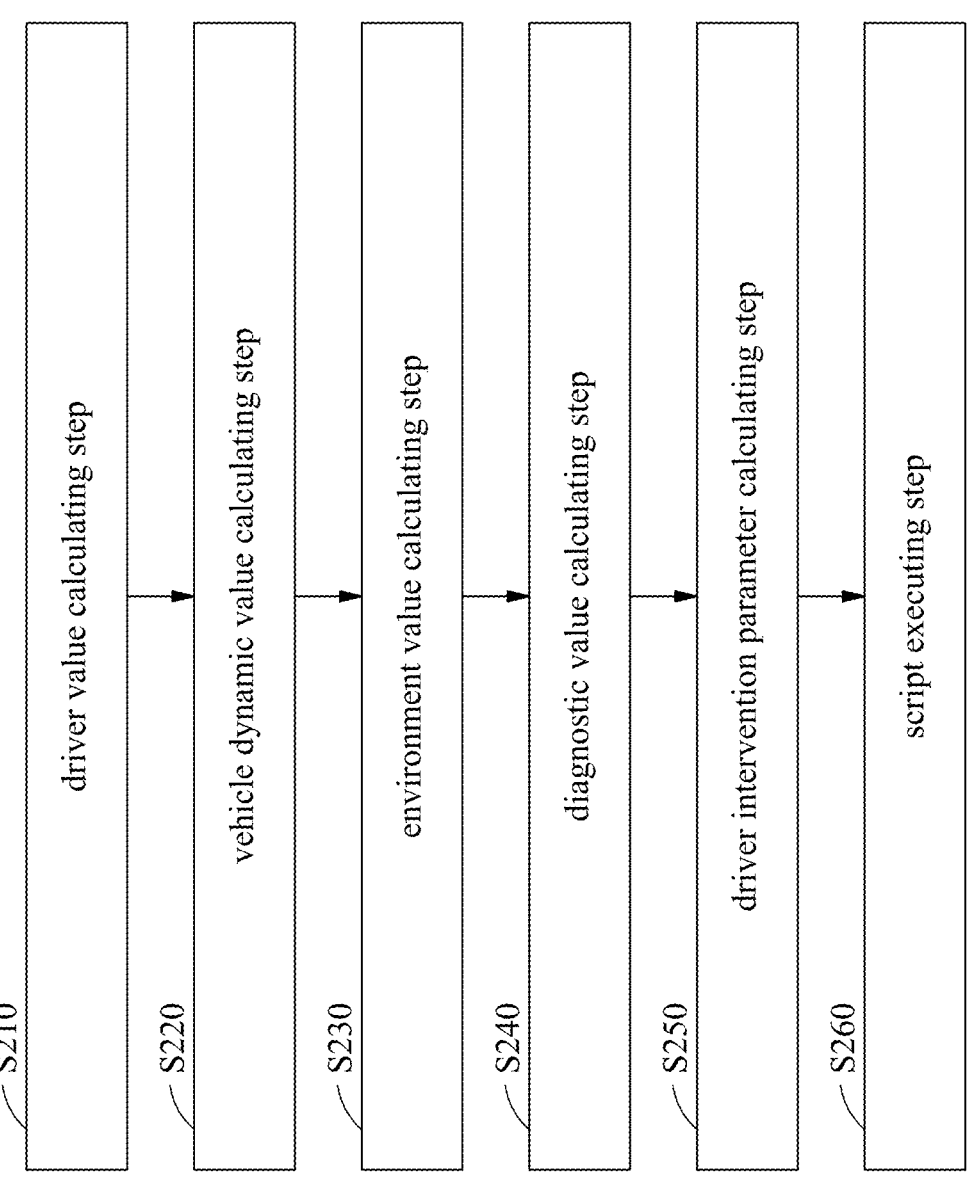
FIG. 2 shows a block flow chart of a driver intervention guiding method according to another embodiment of the present disclosure.

The embodiments of the present disclosure will be illustrated with drawings hereinafter. In order to clearly describe the content, many practical details will be mentioned with the description hereinafter. However, it will be understood by the reader that the practical details will not limit the present disclosure. In other words, in some embodiment of the present disclosure, the practical details are not necessary. Additionally, in order to simplify the drawings, some conventional structures and elements will be illustrated in the drawings in a simple way; the repeated elements may be labeled by the same or similar reference numerals.

In addition, the terms first, second, third, etc. are used herein to describe various elements or components, these elements or components should not be limited by these terms. Consequently, a first element or component discussed below could be termed a second element or component. Moreover, the combinations of the elements, the components, the mechanisms and the modules are not well-known, ordinary or conventional combinations, and whether the combinations can be easily completed by the one skilled in the art cannot be judged based on whether the elements, the components, the mechanisms or the module themselves are well-known, ordinary or conventional.

Figure 1:
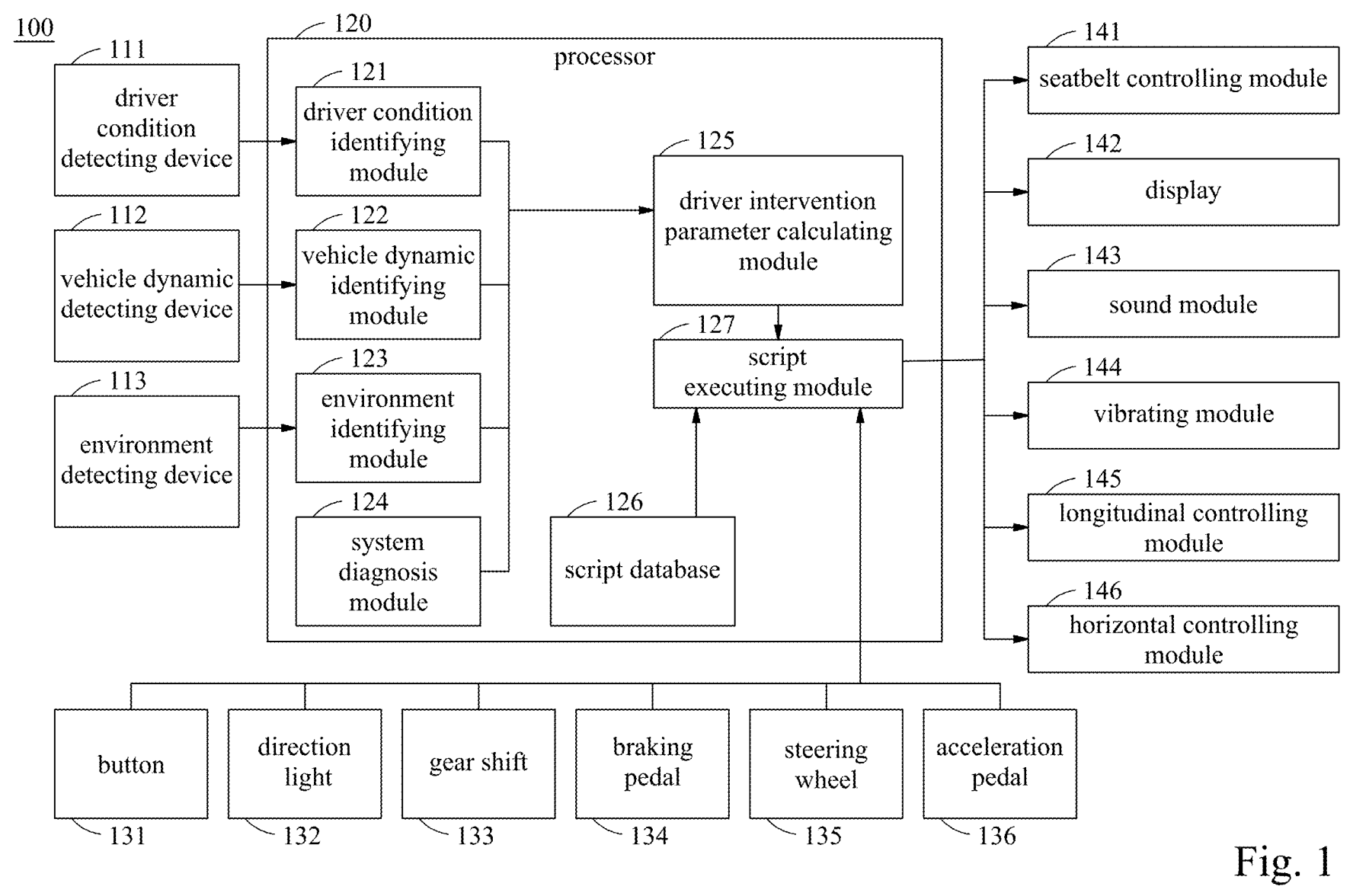

FIG. 1 shows a block diagram of a driver intervention guiding system 100 according to one embodiment of the present disclosure. The driver intervention guiding system 100 includes a driver condition detecting device 111 installed at a vehicle and configured for detecting a condition of a driver of the vehicle, a vehicle dynamic detecting device 112 installed at the vehicle and configured for detecting a dynamic of the vehicle, an environment detecting device 113 installed at the vehicle and configured for detecting a driving environment of the vehicle, and a processor 120 installed at the vehicle.

The processor 120 includes a driver condition identifying module 121, a vehicle dynamic identifying module 122, an environment identifying module 123, a system diagnosis module 124, a driver intervention parameter calculating module 125, a script database 126, and a script executing module 127. The driver condition identifying module 121 is signally connected to the driver condition detecting device 111, and provides a driver value based on the condition of the driver. The vehicle dynamic identifying module 122 is signally connected to the vehicle dynamic detecting device 112, and provides a vehicle dynamic value based on the dynamic of the vehicle. The environment identifying module 123 is signally connected to the environment detecting device 113, and provides an environment value based on the driving environment of the vehicle. The system diagnosis module 124 is configured to diagnose a condition of a system of the vehicle and to provide a diagnostic value according thereto. The driver intervention parameter calculating module 125 is signally connected to the driver condition identifying module 121, the vehicle dynamic identifying module 122, the environment identifying module 123 and the system diagnosis module 124, and calculates a driver intervention parameter based on the driver value, the vehicle dynamic value, the environment value and the diagnostic value. The script database 126 includes a plurality of scripts. The script executing module 127 is signally connected to the driver intervention parameter calculating module 125 and the script database 126, and the script executing module 127 selects one of the scripts of the script database 126 based on the driver intervention parameter.

Therefore, the driver intervention parameter may be calculated based on the condition of the driver, the dynamic of the vehicle, the driving environment and the condition of the system, and the most appropriate script for the current situation may be selected according to the driver intervention parameter for appropriately guiding the driver to intervene, which may increase the smooth of guiding the driver to intervene and ensure the driving safety. The details of the driver intervention guiding system 100 may be described hereinafter.

The driver condition detecting device 111 may include safe cameras, radars and physical sensors to detect the eyes, expression, posture or heart rate of the driver, and may identify the condition of the driver, e.g., normal driving, drowsy driving, distracted driving, using a cell phone, smoking or yawning. The vehicle dynamic detecting device 112 may include speed sensors and direction sensors to obtain the azimuth angle data, the speed data, the motion data and the position data as the vehicle is moving. The environment detecting device 113 may include cameras, radars, LiDARs and communicators to detect obstacles, signs, front or rear vehicles, neighboring vehicles or lane markings for detecting the driving environment.

The processor 120 may include a central processing unit (CPU), a digital signal processor (DSP), a microprocessor unit (MPU) or a microcontroller unit (MCU). The processor 120 may be programed to conduct specific functions. In the present disclosure, the processor 120 is programed to include the driver condition identifying module 121, the vehicle dynamic identifying module 122, the environment identifying module 123, the system diagnosis module 124, the driver intervention parameter calculating module 125, the script database 126, and the script executing module 127. In addition to the aforementioned functions, the processor 120 may include a control program of the driver assistance system to conduct a general control of the vehicle and the image processing, but the present disclosure is not limited thereto.

The driver condition identifying module 121 may obtain the current condition of the driver as receiving the detected data from the driver condition detecting device 111, and provides different driver values based on different distracted levels of the driver. For example, the driver value is given as 0 for normal driving, the driver value is given as 1 for drowsy driving, and the present disclosure is not limited thereto.

The vehicle dynamic identifying module 122 may obtain the current dynamic of the vehicle as receiving the detected data from the vehicle dynamic detecting device 112, and provides different vehicle dynamic values based on different dynamics of the vehicle. For example, the vehicle dynamic value is given as 0 as the vehicle is at standstill, the vehicle dynamic value is given as 0x82 as the vehicle accelerates to drive forward, and the present disclosure is not limited thereto.

The environment identifying module 123 may obtain the condition of the driving environment as receiving the detected data from the environment detecting device 113, and provides different environment values based on the relative position or distance between the vehicle and the obstacle. For example, the environment value is given as 0 if no obstacle is present, the environment value is given as 0x81 if the distance between the vehicle and the obstacle is far, and the present disclosure is not limited thereto.

The system diagnosis module 124 may diagnose the condition of the mechanisms, judge whether each of the mechanisms is normal based on the received signals, and provide different diagnostic values based on different abnormal mechanisms. For example, the diagnostic value is given as 0 if no mechanism is abnormal, the diagnostic value is given as 1 if the sensor is abnormal, and the present disclosure is not limited thereto.

The scripts may be edited by an editor, and are stored in the script database 126. The script is formed by a plurality of nodes. The nodes may be divided into two node types, i.e., an input type and an output type. Each node may input or output corresponding parameters. An output node may include a node number, the node type, the node number for following operation, a parameter quantity, an output interface, and an output content. An input node may include the node number, the node type, the node number executed after time-out, the node number executed after receiving a braking pedal signal, the node number executed after receiving an acceleration pedal signal, and the node number executed after receiving a steering wheel signal.

As shown in FIG. 1, the driver intervention guiding system 100 may further include a button 131, a direction light 132, a gear shift 133, a braking pedal 134, a steering wheel 135, an acceleration pedal 136, a seatbelt controlling module 141, a display 142, a sound module 143, a vibrating module 144, a longitudinal controlling module 145 and a horizontal controlling module 146. The button 131 is disposed at the vehicle for operating components of the vehicle and provides a button signal. The direction light 132 is disposed at the vehicle for showing the turning direction of the vehicle and provides a direction light signal. The gear shift 133 is disposed at the vehicle for switching gears and provides a gear shift signal. The braking pedal 134 is disposed at the vehicle for braking and provides the braking pedal signal. The steering wheel 135 is disposed at the vehicle for changing the driving angle and provides the steering wheel signal. The acceleration pedal 136 is disposed at the vehicle for changing the driving speed and provides the acceleration pedal signal. The seatbelt controlling module 141 is disposed at the vehicle for controlling the seatbelt to fasten. The display 142 is disposed at the dashboard of the vehicle for displaying a pattern. The sound module 143 is disposed at the vehicle for providing sound. The vibrating module 144 is disposed at the steering wheel 135, the seat or other positions of the vehicle for providing vibration. The longitudinal controlling module 145 is disposed at the vehicle for accelerating or decelerating in a longitudinal direction. The horizontal controlling module 146 is disposed at the vehicle for accelerating or decelerating in a horizontal direction.

In the present disclosure, the button 131, the direction light 132, the gear shift 133, the braking pedal 134, the steering wheel 135 and the acceleration pedal 136 may be used as signal input sources. The seatbelt controlling module 141, the display 142, the sound module 143, the vibrating module 144, the longitudinal controlling module 145 and the horizontal controlling module 146 may be used as operation outputs. Hence, the script executing module 127 may be configured to input the braking pedal signal, the button signal, the direction light signal, the gear shift signal, the acceleration pedal signal, or the steering wheel signal based on the one of the scripts of the script database 126. The script executing module 127 may be configured to control the display 142 to display the pattern, control the sound module 143 to execute a sound file, control the seatbelt controlling module 141 to execute fastening, or control the horizontal controlling module 146 or the longitudinal controlling module 145 to operate based on the one of the scripts of the script database 126.

The driver intervention parameter calculating module 125 calculates the driver intervention parameter after receiving the driver value, the vehicle dynamic value, the environment value and the diagnostic value. In the present disclosure, the driver intervention parameter calculating module 125 may include a first to an Nth weight levels, N is a positive integer, and each of the scripts includes a plurality of nodes arranged in order. The driver intervention parameter calculating module 125 uses the first weight level to conduct a first calculation, and as the script executing module 127 finishes executing the one of the scripts based on the braking pedal signal, the acceleration pedal signal, or the steering wheel signal, a node quantity of the nodes which are performed is calculated for deciding which one of the first to the Nth weight levels is used for the driver intervention parameter calculating module 125 to conduct a second calculation.

Precisely, each of the first to the Nth weight levels includes a driver weight, a system weight and an environment-and-dynamic weight. The driver weight of each of the first to the Nth weight levels corresponds to the driver value, the system weight of each of the first to the Nth weight levels corresponds to the diagnostic value, and the environment-and-dynamic weight of each of the first to the Nth weight levels corresponds a sum of the environment value and the vehicle dynamic value. For example, the driver weight is represented as $W1$, the system weight is represented as $W2$, the environment-and-dynamic weight is represented as $W3$, the driver value is represented as $Ds$, the diagnostic value is represented as $Ss$, the vehicle dynamic value is represented as $Vs$, the environment value is represented as $Ps$, the sum of the environment value $Ps$ and the vehicle dynamic value $Vs$ is represented as $PV$, the driver intervention parameter is represented as $DI$, and the weight level is represented as QLevel. In the beginning, QLevel is predetermined as the first weight level, that is, QLevel=1, and $W1=0.30$, $W2=0.30$ and $W3=0.40$. The driver intervention parameter calculating module 125 calculates $PV=True(((Vs \& Ps) \& 0xF0) \times (Vs \& 0x0F) \times (Ps \& 0x0F))$ first, and then calculates $DI=Ds \times W1 + Ss \times W2 + PV \times W3$ to obtain the driver intervention parameter $DI$. It is noted that, if the driver intervention parameter includes decimals, the driver intervention parameter may be rounded up, rounded down or rounded off to obtain an integer.

As the node quantity of the nodes which are performed is between 1 to 3, the first weight level, i.e., QLevel=1, may then be used. As the node quantity of the nodes which are performed is between 4 to 6, the second weight level, i.e., QLevel=2, may then be used, and $W1=0.35$, $W2=0.25$ and $W3=0.40$. As the node quantity of the nodes which are performed is between 7 to 9, the third weight level, i.e., QLevel=3, may then be used, and $W1=0.35$, $W2=0.30$ and $W3=0.35$. Hence, if the node quantity of the nodes which are performed is small, it means that the driver can smoothly intervene the operation of the vehicle with simple guidance. If the node quantity of the nodes which are performed is large, it means that the simple guidance may not work, and fierce guidance may be required. Therefore, as calculating the driver intervention parameter in the next time, a fierce script may be directly adapted with considering the hobbit of the driver, and functions of self-learning and self-adjusting may be achieved. In other embodiments, the driver intervention parameter may be calculated by other equations, and the present disclosure is not limited thereto.

FIG. 2 shows a block flow chart of a driver intervention guiding method S200 according to another embodiment of the present disclosure. The driver intervention guiding method S200 includes a driver value calculating step S210, a vehicle dynamic value calculating step S220, an environment value calculating step S230, a diagnostic value calculating step S240, a driver intervention parameter calculating step S250, and a script executing step S260.

In the driver value calculating step S210, a driver condition detecting device of a processor provides a driver value based on a condition of a driver of a vehicle.

7

In the vehicle dynamic value calculating step S220, a vehicle dynamic identifying module of the processor provides a vehicle dynamic value based on a dynamic of the vehicle.

In the environment value calculating step S230, an environment identifying module of the processor provides an environment value based on a driving environment of the vehicle.

In the diagnostic value calculating step S240, a system diagnosis module of the processor diagnoses a condition of a system of the vehicle and provides a diagnostic value according thereto.

In the driver intervention parameter calculating step S250, a driver intervention parameter calculating module of the processor calculates a driver intervention parameter based on the driver value, the vehicle dynamic value, the environment value and the diagnostic value.

In the script executing step S260, a script executing module of the processor selects one of a plurality of scripts of a script database based on the driver intervention parameter.

Therefore, with the driver value calculating step S210, the vehicle dynamic value calculating step S220, the environment value calculating step S230, the diagnostic value calculating step S240, the driver intervention parameter calculating step S250, and the script executing step S260, the script executing module may be configured to input a braking pedal signal, an acceleration pedal signal or a steering wheel signal based on the selected one of the scripts, or may be configured to control a display to display a pattern, control a sound module to execute a sound file, or control a horizontal controlling module or a longitudinal controlling module to operate based on the selected one of the scripts.

Moreover, in the script executing step S260, if the driver keeps not intervening, the script executing module may be configured to control the vehicle to decelerate to zero. To be more specific, if the driver does not have any reaction during the guidance, some accidents may happen to the driver or the driver may go into a deep coma, or danger may occur if the driver does not take over, and the vehicle have to stop immediately to prevent danger. Other details similar to the embodiment of FIG. 1 will not be repeated.

Figure 3:
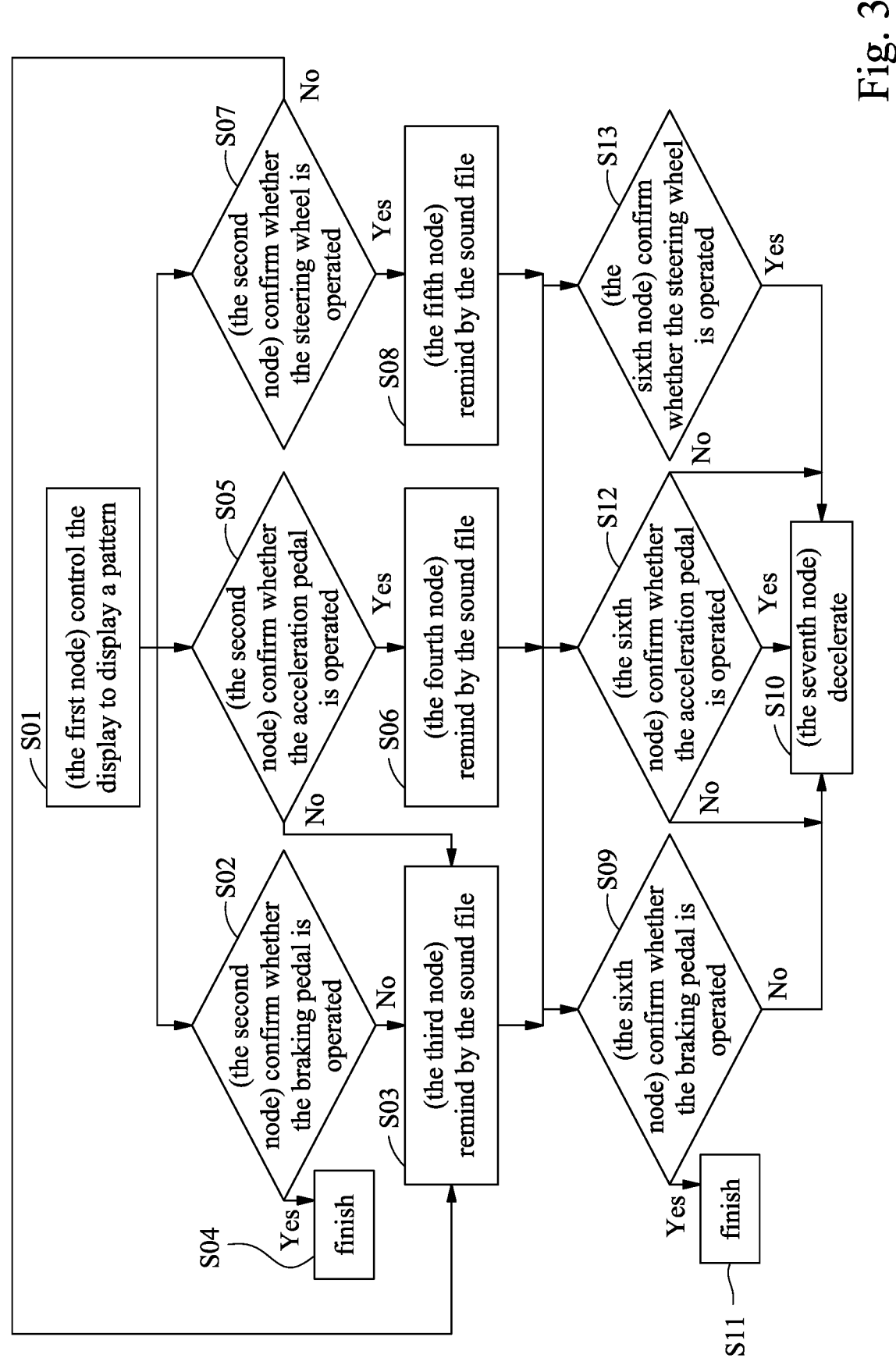
FIG. 3 shows a flow chart of a script of the driver intervention guiding method of FIG. 2.

FIG. 3 shows a flow chart of a script of the driver intervention guiding method S200 of FIG. 2. In the embodiment shown in FIG. 3, the driver drives in an intersection and is going to turn right, but the driver does not focus on driving and does not watch the right side, and the blind spot monitoring detects an obstacle. At this time, the driver condition detecting device detects that the driver is using the cell phone, and the driver value is given as 3 by the driver condition identifying module. The vehicle dynamic detecting device detects that the vehicle is accelerating and turning right, and the vehicle dynamic value is given as 0x12 by the vehicle dynamic identifying module. The environment detecting device detects that the obstacle is only present in the right side, and the environment value is given as 0x14 by the environment identifying module. The system diagnosis module detects that the system is normal, and the diagnostic value is given as 0. As conducting a first calculation, the driver intervention parameter calculating module calculates PV=True((($0x12$ & $0x14$) & $0xF0$)×($0x12$ & $0x0F$)×($0x14$ & $0x0F$))=8 first, then calculates DI=3×0.30+0×0.30+8×0.40=4.1, 4.1 is rounded off to 4, and the driver intervention parameter is given as 4.

Subsequently, the script in the script database that corresponds to the driver intervention parameter being 4 can be selected. The script may be shown as Table 1 below. The script includes the node number ("No." for short), the node type ("type" for short), the node number for following operation ("following No." for short), the parameter quantity, the output interface ("interface" for short), the output content ("content" for short), the node number executed after time-out ("time-out No." for short), the node number executed after receiving the braking pedal signal ("braking No." for short), the node number executed after receiving the acceleration pedal signal ("acceleration No." for short), and the node number executed after receiving the steering wheel signal ("steering wheel No." for short).

TABLE 1

| No. | | | | type | |
|---|---|---|---|---|---|
| 000 | | | | finish | |

| No. | type | following No. | parameter quantity | interface | content |
|---|---|---|---|---|---|
| 001 | output | 002 | 1 | display | pattern 1 |

| No. | type | time-out No. | braking No. | acceleration No. | steering wheel No. |
|---|---|---|---|---|---|
| 002 | input | 003 | 000 | 004 | 005 |

| No. | type | following No. | parameter quantity | interface | content |
|---|---|---|---|---|---|
| 003 | output | 006 | 1 | sound module | sound file 1 |

| No. | type | following No. | parameter quantity | interface | content |
|---|---|---|---|---|---|
| 004 | output | 006 | 1 | sound module | sound file 2 |

| No. | type | following No. | parameter quantity | interface | content |
|---|---|---|---|---|---|
| 005 | output | 006 | 1 | sound module | sound file 3 |

| No. | type | time-out No. | braking No. | acceleration No. | steering wheel No. |
|---|---|---|---|---|---|
| 006 | input | 007 | 000 | 007 | 007 |

| No. | type | following No. | parameter quantity | interface | content |
|---|---|---|---|---|---|
| 007 | output | 000 | 1 | longitudinal controlling module | deceleration 1 |

As shown in FIG. 3, the script executing module executes Step S01 based on the script of Table 1 to execute the first node (No. 001), and the display is controlled to display a pattern, i.e., the pattern 1. Steps S02, S05 and S07 execute the second node (No. 002) to respectively confirm whether the braking pedal is operated and the braking pedal signal is received, whether the acceleration pedal is operated and the acceleration pedal signal is received, and whether the steering wheel is operated and the steering wheel signal is received. If in Step S02 the braking pedal signal is received, it means that the driver operates the braking pedal after watching the pattern shown on the display, and Step S04 is executed to execute the node (No. 000) to finish operating the scrip. On the contrary, Step S03 is executed to remind the driver by the sound file. That is, the third node (No. 003) is executed, and the sound module provides a sound based on the sound file 1 to remind the driver. Steps S09, S12 and S13 execute the sixth node (No. 006) to respectively confirm whether the braking pedal is operated and the braking pedal signal is received, whether the acceleration pedal is operated and the acceleration pedal signal is received, and whether the steering wheel is operated and the steering wheel signal is received. If in Step S09 the braking pedal signal is received, it means that the driver operates the braking pedal after listening the sound, and Step S11 is executed to execute the node (No. 000) to finish operating the scrip. In Step S12, no matter receiving the acceleration pedal signal or not, Step S10 is executed to execute the seventh node (No. 007), and the longitudinal controlling module is operated to decelerate at deceleration 1. Moreover, in Step S13, no matter receiving the steering wheel signal or not, Step S10 is executed to execute the seventh node (No. 007), and the longitudinal controlling module is operated to decelerate at deceleration 1. Since acceleration (receiving the acceleration pedal signal) or turning (receiving the steering wheel signal) may not be helpful for the current situation and danger may occur, and the vehicle is controlled to decelerate.

If in Step S05 the acceleration pedal signal is not received, or in Step S07 the steering wheel signal is not received, it means that the driver does not react, and Step S03 is executed to remind the driver by the sound file. On the contrary, if in Step S05 the acceleration pedal signal is received, or in Step S07 the steering wheel signal is received, it means that the driver does react but the reaction is not proper, and Step S06 is executed to execute the fourth node (No. 004) to output the sound file 4 or Step S08 is executed to execute the fifth node (No. 005) to output the sound file 5. After which, Steps S09, S12 and S13 are executed.

Based on the aforementioned embodiment, the driver intervention guiding system and the driver intervention guiding method of the present disclosure can provide different scripts according to different situations, different driver reactions and different vehicle dynamics when there is a requirement to have the driver intervene to control the vehicle as detecting abnormal or exceeding the operation of the assisting system. Therefore, the driver can be smoothly guided to intervene and the driving safety may be ensured.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A driver intervention guiding system, comprising:
a driver condition detecting device installed at a vehicle and configured for detecting a condition of a driver of the vehicle;
a vehicle dynamic detecting device installed at the vehicle and configured for detecting a dynamic of the vehicle;
an environment detecting device installed at the vehicle and configured for detecting a driving environment of the vehicle; and
a processor installed at the vehicle and comprising:

a driver condition identifying module signally connected to the driver condition detecting device, and providing a driver value based on the condition of the driver;
a vehicle dynamic identifying module signally connected to the vehicle dynamic detecting device, and providing a vehicle dynamic value based on the dynamic of the vehicle;
an environment identifying module signally connected to the environment detecting device, and providing an environment value based on the driving environment of the vehicle;
a system diagnosis module configured to diagnose a condition of a system of the vehicle and to provide a diagnostic value according thereto;
a driver intervention parameter calculating module signally connected to the driver condition identifying module, the vehicle dynamic identifying module, the environment identifying module and the system diagnosis module, and calculating a driver intervention parameter based on the driver value, the vehicle dynamic value, the environment value and the diagnostic value;
a script database comprising a plurality of scripts; and
a script executing module signally connected to the driver intervention parameter calculating module and the script database, and the script executing module selecting one of the scripts of the script database as a selected one of the scripts based on the driver intervention parameter, wherein the script executing module is configured to input a braking pedal signal, a button signal, a direction light signal, a gear shift signal, an acceleration pedal signal, or a steering wheel signal based on the selected one of the scripts, wherein the script executing module controls a horizontal controlling module or a longitudinal controlling module to operate based on the selected one of the scripts to accelerate or decelerate the vehicle;
wherein the driver intervention parameter calculating module comprises a first to an Nth weight levels, N is a positive integer, each of the scripts comprises a plurality of nodes arranged in order, the driver intervention parameter calculating module uses the first weight level to conduct a first calculation, and as the script executing module finishes operation, a node quantity of the nodes which are performed is calculated for deciding which one of the first to the Nth weight levels is used for the driver intervention parameter calculating module to conduct a second calculation.

2. The driver intervention guiding system of claim 1, wherein the script executing module is configured to control a display to display a pattern, control a sound module to execute a sound file, control a seatbelt controlling module to execute fastening, or control a horizontal controlling module or a longitudinal controlling module to operate based on the selected one of the scripts.

3. The driver intervention guiding system of claim 1, wherein each of the first to the Nth weight levels comprises a driver weight, a system weight and an environment-and-dynamic weight, the driver weight of each of the first to the Nth weight levels corresponds to the driver value, the system weight of each of the first to the Nth weight levels corresponds to the diagnostic value, and the environment-anddynamic weight of each of the first to the Nth weight levels corresponds a sum of the environment value and the vehicle dynamic value.

4. A driver intervention guiding method, comprising:

a driver value calculating step, wherein a driver condition detecting device of a processor provides a driver value based on a condition of a driver of a vehicle;

a vehicle dynamic value calculating step, wherein a vehicle dynamic identifying module of the processor provides a vehicle dynamic value based on a dynamic of the vehicle;

an environment value calculating step, wherein an environment identifying module of the processor provides an environment value based on a driving environment of the vehicle;

a diagnostic value calculating step, wherein a system diagnosis module of the processor diagnoses a condition of a system of the vehicle and provides a diagnostic value according thereto;

a driver intervention parameter calculating step, wherein a driver intervention parameter calculating module of the processor calculates a driver intervention parameter based on the driver value, the vehicle dynamic value, the environment value and the diagnostic value; and a script executing step, wherein a script executing module of the processor selects one of a plurality of scripts of a script database as a selected one of the scripts based on the driver intervention parameter, wherein the script executing module is configured to input a braking pedal signal, a button signal, a direction light signal, a gear shift signal, an acceleration pedal signal, or a steering wheel signal based on the selected one of the scripts, wherein the script executing module controls a horizontal controlling module or a longitudinal controlling module to operate based on the selected one of the scripts to accelerate or decelerate the vehicle;

wherein the driver intervention parameter calculating module comprises a first to an Nth weight levels, N is a positive integer, each of the scripts comprises a plurality of nodes arranged in order, in the driver intervention parameter calculating step, the driver intervention parameter calculating module uses the first weight level to conduct a first calculation, and as in the script executing step the script executing module finishes executing the selected one of the scripts based on the braking pedal signal, the acceleration pedal signal, or the steering wheel signal, a node quantity of the nodes which are performed is calculated for deciding which one of the first to the Nth weight levels is used for the driver intervention parameter calculating module to conduct a second calculation.

5. The driver intervention guiding method of claim 4, wherein in the script executing step, the script executing module is configured to control a display to display a pattern, control a sound module to execute a sound file, control a seatbelt controlling module to execute fastening, or control a horizontal controlling module or a longitudinal controlling module to operate based on the selected one of the scripts.

6. The driver intervention guiding method of claim 4, wherein in the script executing step, if the driver keeps not intervening, the script executing module is configured to control the vehicle to decelerate to zero.

7. A non-transitory computer-readable memory, storing a computer program which is executed by a processor for:

providing a driver value based on a condition of a driver, wherein the condition of the driver is detected by a driver condition detecting device installed at a vehicle;

providing a vehicle dynamic value based on a dynamic of the vehicle, wherein the dynamic of the vehicle is detected by a vehicle dynamic detecting device installed at the vehicle;

providing an environment value based on a driving environment of the vehicle, wherein the driving environment of the vehicle is detected by an environment detecting device installed at the vehicle;

provide a diagnostic value based on diagnosing a condition of a system of the vehicle;

calculating a driver intervention parameter based on the driver value, the vehicle dynamic value, the environment value and the diagnostic value;

selecting one of a plurality of scripts of a script database as a selected one of the scripts based on the driver intervention parameter, inputting a braking pedal signal, a button signal, a direction light signal, a gear shift signal, an acceleration pedal signal, or a steering wheel signal based on the selected one of the scripts, and controlling a horizontal controlling module or a longitudinal controlling module to operate based on the selected one of the scripts to accelerate or decelerate the vehicle;

wherein a first to an Nth weight levels are contained, N is a positive integer, each of the scripts comprises a plurality of nodes arranged in order, while calculating the driver intervention parameter, the first weight level is used to conduct a first calculation, and as executing the selected one of the scripts based on the braking pedal signal, the acceleration pedal signal, or the steering wheel signal is finished, a node quantity of the nodes which are performed is calculated for deciding which one of the first to the Nth weight levels is used for conducting a second calculation.

* * * * *